United States Patent
Liou

(10) Patent No.: US 8,770,485 B1
(45) Date of Patent: Jul. 8, 2014

(54) ACTUATION METHOD OF VIRTUAL LASER BARCODE SCANNER

(71) Applicant: Marson Technology Co., Ltd, New Taipei (TW)

(72) Inventor: Kenneth Liou, New Taipei (TW)

(73) Assignee: Marson Technology Co., Ltd., New Taipei (TW)

( * ) Notice: Subject to any disclaimer, the term of this patent is extended or adjusted under 35 U.S.C. 154(b) by 0 days.

(21) Appl. No.: 13/930,579

(22) Filed: Jun. 28, 2013

(51) Int. Cl.
*G06K 7/10* (2006.01)
*G08C 21/00* (2006.01)

(52) U.S. Cl.
USPC . 235/462.06; 235/454; 235/455; 235/462.01; 235/462.25; 235/462.42

(58) Field of Classification Search
CPC .......... G06K 7/10594; G06K 7/10722; G06K 7/10831; G06K 7/10792; G06K 7/109; G06K 9/228
USPC .................. 235/454, 455, 462.01–472.01
See application file for complete search history.

(56) References Cited

U.S. PATENT DOCUMENTS

| | | | | |
|---|---|---|---|---|
| 4,877,949 A | * | 10/1989 | Danielson et al. | 235/462.21 |
| 5,880,452 A | * | 3/1999 | Plesko | 235/472.01 |
| 6,520,414 B2 | * | 2/2003 | Tanioka et al. | 235/462.33 |
| 7,222,794 B2 | * | 5/2007 | Kumagai et al. | 235/462.43 |
| 2002/0104885 A1 | * | 8/2002 | Tanioka et al. | 235/462.33 |
| 2007/0295813 A1 | * | 12/2007 | Kotlarsky et al. | 235/454 |
| 2008/0149723 A1 | * | 6/2008 | Zhu et al. | 235/462.11 |
| 2009/0084851 A1 | * | 4/2009 | Vinogradov et al. | 235/462.21 |
| 2013/0026236 A1 | * | 1/2013 | Goren | 235/462.21 |

\* cited by examiner

*Primary Examiner* — Tuyen K Vo
(74) *Attorney, Agent, or Firm* — Bacon & Thomas, PLLC

(57) ABSTRACT

An actuation method of virtual laser barcode scanner, in which a light spot emitted from a laser module is formed into a linear laser beam, after passing through a fixed type refractive lens, for user to align to an one dimension barcode position. When the barcode is been reading, the laser beam is switched off and a linear CCD or linear CMOS receives directly the environmental light reflected from the one dimension barcode so as to finish the barcode reading. If the reading is failed, the laser beam is switched on again. As the ON-OFF of the laser module is faster than the speed of visual persistence of human's eyes, the virtual laser barcode scanner is used as if a conventional laser barcode scanner were used.

4 Claims, 6 Drawing Sheets

ACTUATION METHOD OF VIRTUAL LASER BARCODE SCANNER

BACKGROUND OF INVENTION

1. Field of the Invention

The present invention relates to an actuation method of virtual laser barcode scanner, more particularly to an actuation method of virtual laser barcode scanner in which a non-scanning fixed linear laser beam is employed as indicating light source to align to an one dimension barcode, and environment light is employed as the light for reading; when the barcode is been reading, the laser is switched off and a linear CCD or linear CMOS simultaneously picks up the environmental light reflected from each point of the one dimension barcode so as to finish the barcode reading.

2. Brief Description of the Prior Art

One-dimensional barcode is a data representation made by varying the widths and spacings of parallel bars according to a coding rule. The information contained in the barcode can be obtained and decoded by laser scanning and pickup of the reflected laser light. In the conventional laser barcode scanner, laser is employed as the reading light source and a reciprocating and rotating mirror is employed to reflect the light spot of the laser into a laser beam which is used to scan an one-dimensional barcode so as to generate a series of reflected laser light spots. A photo sensor is employed to receive the signal with variation in brightness of the laser light spots, and to decode the barcode. The disadvantage of the laser scanner lies in that the reciprocating and rotating mirror is unable to be fixed in place, the overall mechanism is thus too weak to sustain the collision which may cause damage. Further, the rotational speed of the mirror is limited so that the speed of reading the barcode is thus limited too. Further, the brightness of the laser light spots has the phenomena of uneven distribution. If a linear laser beam generated by a refractive lens is employed as barcode reading signal, uneven distribution of brightness of the laser beam will result in generation of noise which may cause unsmoothly decoding of the scanner. So far, there is yet no such product that can completely solve the problems of conventional laser barcode scanner available on market.

SUMMARY OF THE INVENTION

The main object of the present invention is to provide an actuation method of virtual laser barcode scanner, in which a linear CCD or linear CMOS receives directly the environment light reflected from the one dimension barcode so as to finish the barcode reading. The method is used in the way as if a conventional laser barcode scanner were used, and the actuation time is decreased so as to increase the efficiency of operation.

In order to achieve above object, the actuation method of virtual laser barcode scanner of the present invention is provided, in which a laser module is cooperated with a fixed type refractive lens to generate a linear laser beam only for use as an indicating light source. When a linear CCD or linear CMOS is used for barcode reading, the laser beam is switched off and is switched on again after a barcode reading is finished successfully. As the actuation time during ON-OFF of the laser module (i.e., the indicating light source) is faster than the speed of visual persistence of human's eyes, haman's eyes is unable to sense the flash during ON-OFF of the laser module. In this way, though laser beam is employed as the reading light source, in human's eyes the reading is conducted as if a conventional laser barcode scanner were used.

In fact, the reading of barcode takes directly advantage of reflection on one-dimensional barcode by environmental light at site such as illumination light or sun light at site, and the linear CCD or linear CMOS simultaneously picks up reflection signals of environmental light of 500 to 2000 pixels at one time and transforms the light signals into electronic signals so as to complete the barcode reading. In this manner, the present invention is different from the conventional mode of one point-by-one point scanning, therefore the present invention can significantly increase the scanning speed.

DETAILED DESCRIPTION OF PREFERRED EMBODIMENTS

Referring to FIG. 1, that is a schematic view of the constitution of the present invention, the virtual laser barcode scanner 10 of the present invention comprises an electrical carrier board 101, a laser module 102, a reading confirmation light source module 103, a light channel module 104, and an image pickup module 105. The electrical carrier board 101 has a layout of electrical circuit provided thereon, and the above members are also carried on the electrical carrier board 101. The laser module 102 has a fixed type lens 1021 assembled at the front end (projecting end) thereof, the lens 1021 has an appearance of cylindrical shape and the surface thereof is formed as wave shape so that the light passing through it is collimated linearly and then forms a linear laser beam for serving as an indicating light source. After barcode reading operation is finished, the reading confirmation light source module 103 is switched off immediately after it turns on a colored light (for example, green light) so as to allow the operator to notice the accomplishment of barcode scanning operation. The light channel module 104 can receive the light projected or reflected from outside. In addition, The light channel module 104 can reflect light to its channel by assembling a set of reflective members therein. The end of the light channel module 104 is connected to the image pickup module 105, so as to transform the light signals received by the light channel module 104 into electronic signals through photoelectrical transformation. Further, the image pickup module 105 is one of the linear CCD or linear CMOS, which has a reflective structure 1051, but is not limited in this way in its implementation. In addition, the laser module 102 uses a laser as the light source. The reading confirmation light source module 103 has one or multiple wavelengths such as red, green, or is formed by mixing of multiple colors.

Referring to FIG. 2 is a schematic view of the electricalal constitution of the present invention. The electrical carrier board 101 further has a microprocessor module 106 respectively in electrical connection with the laser module 102, the reading confirmation light source module 103, and the image pickup module 105. After actuation, the microprocessor module 106 normally receives the level confirmation signals D1 transferred from the image pickup module 105, and in turn drives the laser module 102 and the reading confirmation light source module 103 respectively to be actuated or to be deactuated. Further, the microprocessor module 106 also receives a transcoding information D2 generated by the actuation of the image pickup module 105 and transfers it to an external electronic device. Moreover, this embodiment exemplifies the generation of the level confirmation signals D1 by the image pickup module 105, however it is not limited in this way. Same effect can be produced by an external sensor element.

FIG. 3 is a flow chart of the implementation of the present invention, and FIG. 4 is a schematic view (I) of the implementation of the present invention. Referring to FIGS. 2 to 4, the actuation flow chart will be described as below.

(1) An indicating light source start step 21: a linear laser beam L1 formed after the start of the indicating light source is used by users to project it onto a barcode B to be read. In the beginning, the microprocessor module 106 transfers an actuation information D3 to drive the laser module 102 to irradiate a laser which is formed into a linear laser beam L1 after passing through the first lens 1021. The linear laser beam L1 is not employed to scan the barcode, but is instead for users to indicate quickly the alignment with the barcode B to be read;

(2) A level signal confirmation step 22: after the linear laser beam L1 is projected onto the barcode B to be read, a first reflected light L2 is generated and received by the image pickup module 105 which later confirms the alignment of the linear laser beam L1 with the one-dimensional barcode. After the confirmation, the image pickup module 105 outputs a level confirmation signal D1 to the microprocessor module 105. As stated above, when the linear laser beam L1 is projected, simultaneously the image pickup module 105 normally detects the first reflected light L2 generated by the irradiation of the linear laser beam L1 on object. When the image pickup module 105 determines the first reflected light L2 does not change, i.e., looks like the optical reflection of a barcode information, then the indicating light source start step 21 is conducted until the image pickup module 105 detects any change happened;

(3) An indicating light source switch-off step 23: following above step, when the microprocessor module 105 receives the level confirmation signal D1, a deactuation information D3 is output to the laser module 102, so as to switch off the indicating light source, and the linear laser beam L1 is disappeared at the same time;

(4) A reflected light generation step 24: following the above step, the microprocessor module 106 deactuates the laser module 102, a reflection light due to irradiation of environmental light on the one-dimensional barcode is simultaneously generated (second reflected light L4), as the one-dimensional barcode is normally exposed to the irradiation of an environmental light source L3, light reflection is naturally produced.

(5) A reflection light receiving step 25: the image pickup module 105 synchronously receives the second reflected light L4. When the environmental light L3 is projected onto the one-dimensional barcode B, a barcode reflected light L4 is produced due to the difference in reflectivity of the black bars and the spacings on the one-dimensional barcode B. The barcode reflected light L4 enters into the light channel 104, and then is projected onto the image pickup module 105 through the light channel 104;

(6) A decoding step 26: the image pickup module 105 transform the second reflected light L4 into electronic signal and conduct to a central control module 106 for decoding. The central control module 106 conducts photoelectrical information transformation so as to obtain the information contained in the one-dimensional barcode B;

(7) A reading confirmation step 27: When the above decoding step 26 is accomplished (i.e., the barcode reading operation is finished), the reading confirmation light source module 103 is actuated to produce a colored light such as green light, so that operator can confirm the barcode reading is successful according to the colored light indication;

(8) The indicating light source start step is repeated; and (9) The time period from the switch-off of the indicating light source to the switch-on of the same is controlled to be less than 1/16 second, which is approximately the visual persistence of human's eyes.

As stated above, in the implementation of the present invention, a linear laser beam is firstly generated by a laser module, and users can assure the level relationship with a barcode by the linear laser beam. When the reading position is confirmed, a microprocessor module deactuates the laser module at once, therefore the environmental light source is directly reflected from the barcode. Then, a linear CCD or a linear CMOS simultaneously receives the reflection signals of 500 to 2000 pixels from the environmental light source so as to accomplish the barcode reading. The time period from the switch-off of the indicating light source to the switch-on of the same is controlled to be less than the time of visual persistence (approximately less than 1/16 second). In this way, when in usage of the present invention, users feel as if a conventional laser bacode scanner were used, however laser light is in fact not used for the scanning but instead the environment light source is served as the light source for reading. Hence, the actuation time required for each barcode scanning can be significantly decreased.

FIG. 5 is another embodiment of the present invention, and FIG. 6 is a schematic view (II) of the present invention. As shown in the figures, there might be different demand on the brightness of reading light source according to different environment. In the case of operation environment with insufficient light source, the barcode scanner may be unable to read barcode due to insufficient light. On the other hand, as the types of current barcode are very diversified, especially colored barcode instead of black-and-white barcode is widely used to coordinate with the color of external packing of the product itself. There might be the case of unabling to read the barcode due to color difference. Therefore, a set of light compensation module 107 can be added in the present invention. An operation brightness detection step 241 can be added in the actuation process of the present invention to follow the reflected light source step 24, in which environment brightness and barcode light color sensing step 241 can be conducted by a brightness and light color sensing module 108 for sensing the brightness of the operation environment at site and the color of the barcode B to be read. If the sensing result is 'yes', the reflected light source step 25 and the subsequent steps are conducted; if the result is 'no', then the brightness at operation environment site is indicated to be insufficient and thus a light compensation step 242 is carried out by the light compensation module 107; or if the color of the barcode is colored, then the relative contrast light color of the barcode is compensated by the light compensation module 107 after sensing by the brightness and light color sensing module 108, so that the barcode reading operation can be smoothly conducted.

Summing up above, the present invention, after implementation, surely can achieve the purpose of providing the actuation method of virtual laser barcode scanner, in which the reflected light of the environment light source on an one-dimensional barcode is received by a linear CCD or a linear CMOS so as to finish barcode reading. The virtual laser barcode scanner is used as if a conventional laser barcode scanner were used, so that the actuation time can be decreased so as to increase the operational efficiency.

While the present invention has been described by preferred embodiments in conjunction with accompanying drawings, it should be understood that the embodiments and the drawings are merely for descriptive and illustrative purpose, not intended for restriction of the scope of the present invention. Equivalent variations and modifications conducted by person skilled in the art without departing from the spirit and scope of the present invention should be considered to be still within the scope of the present invention.

BRIEF DESCRIPTION OF ACCOMPANYING DRAWINGS

Figure 1:
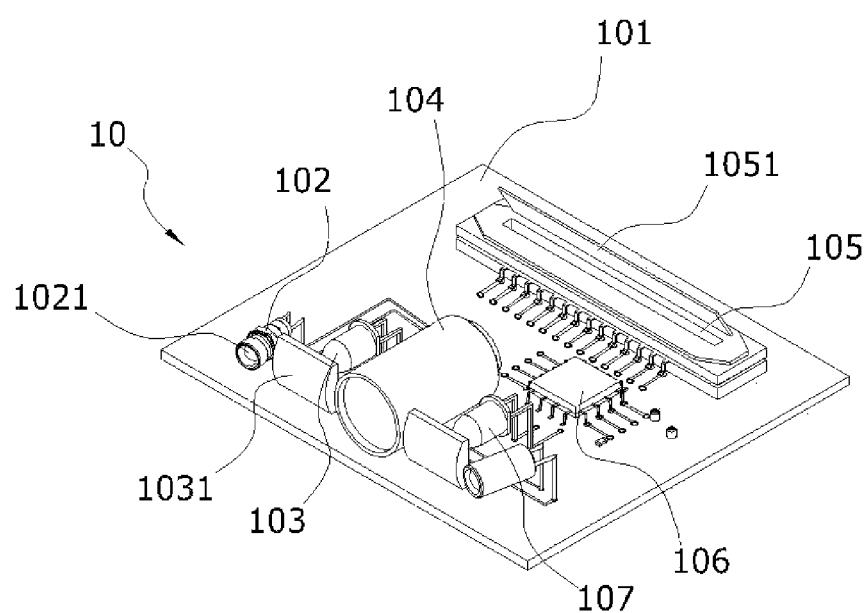
FIG. 1 is a schematic view of the members of the present invention.
Figure 2:
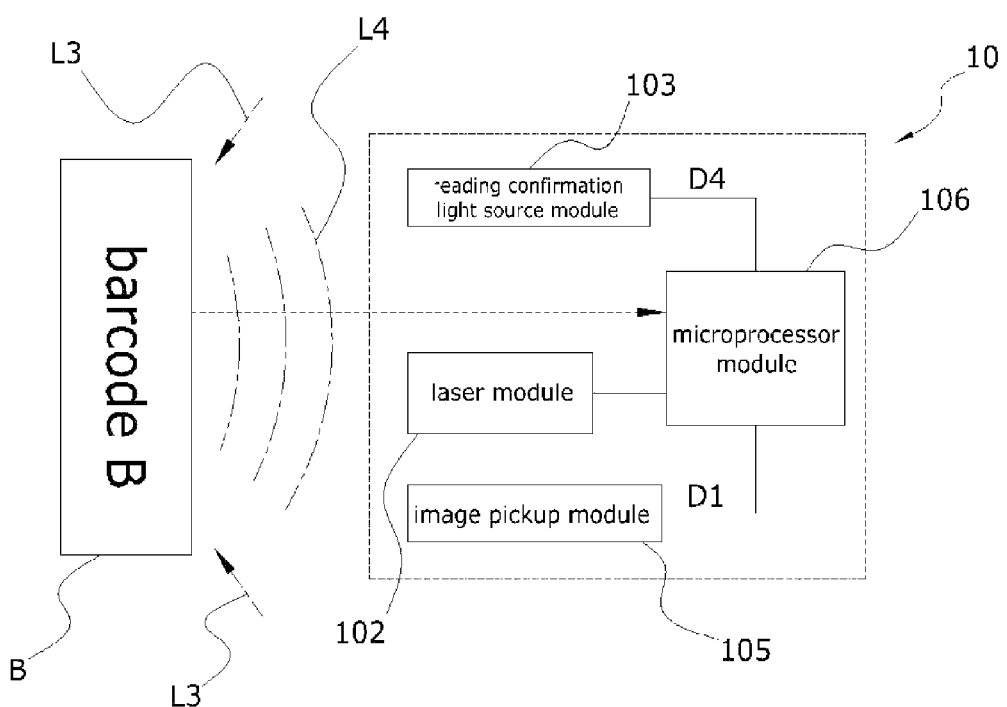
FIG. 2 is a schematic view of the electricalal constitution of the present invention.
Figure 3:
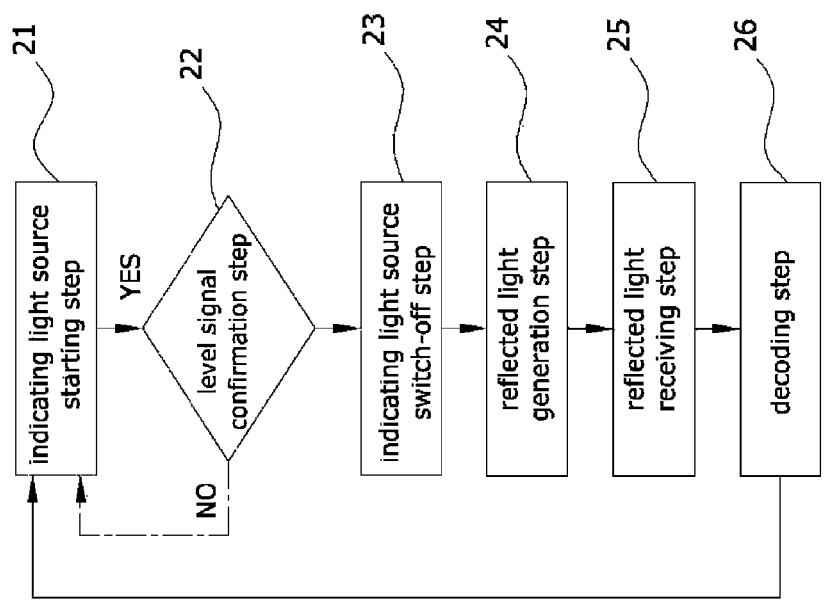
FIG. 3 is a flow chart of the implementation of the present invention.
Figure 4:
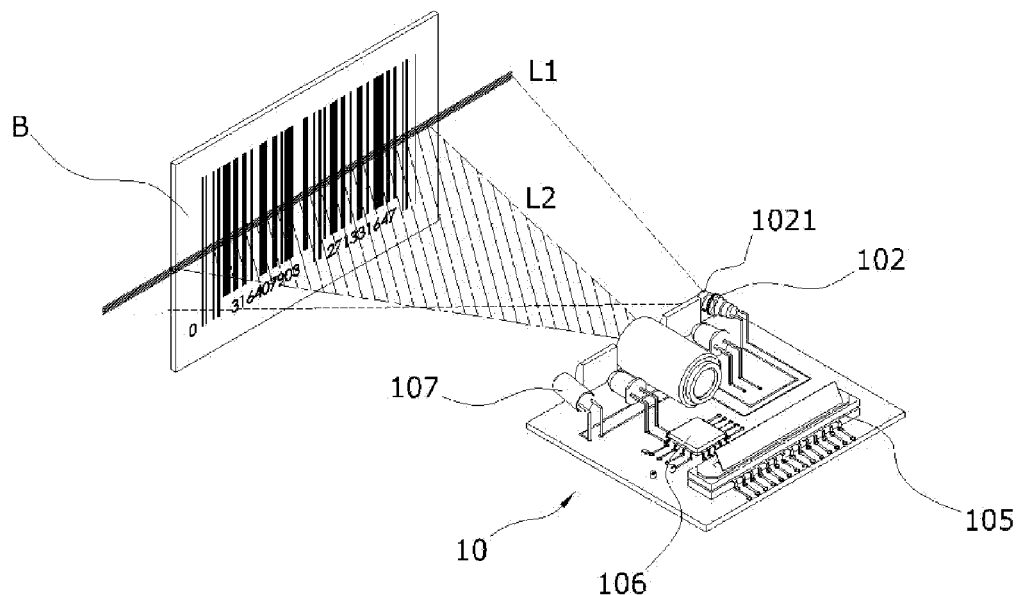
FIG. 4 is a schematic view (I) of the implementation of the present invention.
Figure 5:
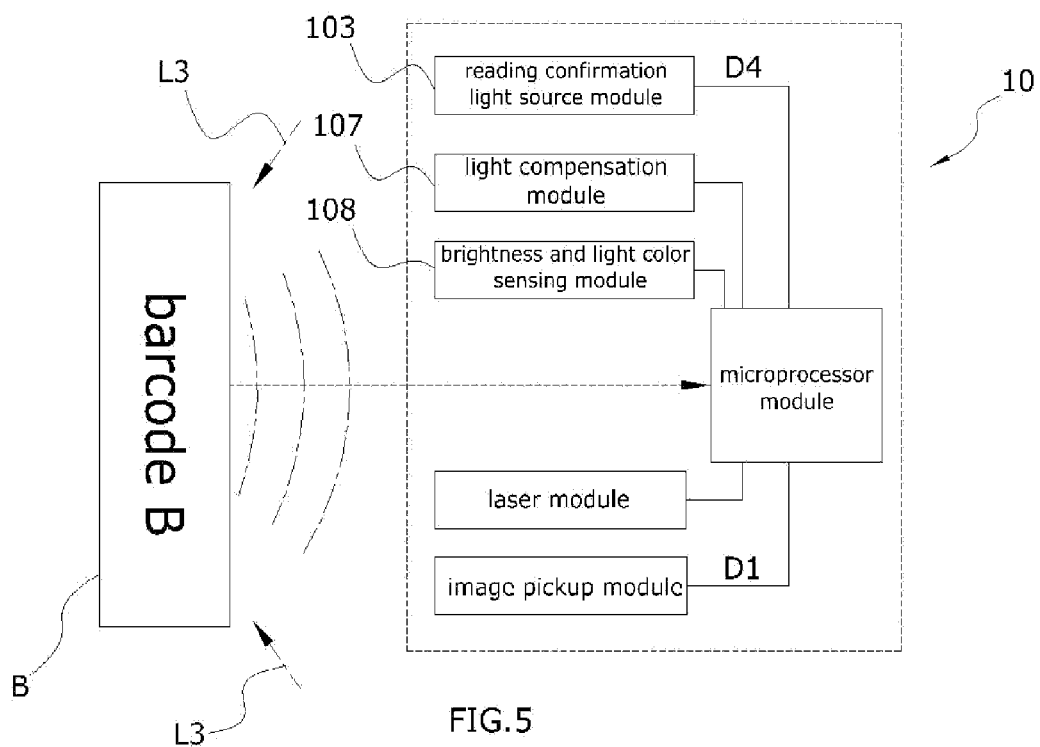
FIG. 5 is another preferred embodiment of the present invention.
Figure 6:
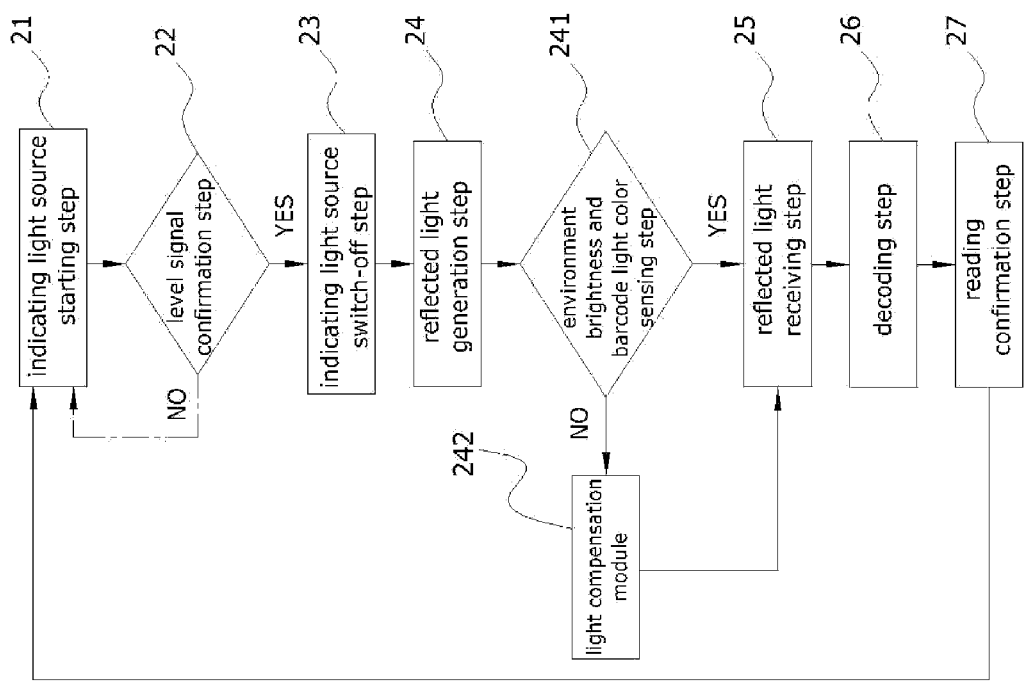
FIG. 6 is a schematic view (II) of the implementation of the present invention.

The invention claimed is:

1. An actuation method of virtual laser barcode scanner, comprising:
   an indicating light source start step: a laser module is started and the laser thus generated is formed to a linear laser beam after passing through a fixed type refractive lens and the linear laser beam is for projecting and aiming onto a one-dimensional barcode to be read;
   a level signal confirmation step: after said linear laser beam is projected onto the barcode to be read, a first reflected light is generated and is received by an image pickup module which outputs a level confirmation signal to a microprocessor module after the image pickup module confirms that said linear laser beam already aligns to said one-dimensional barcode;
   an indicating light source switch-off step: following the above step, said laser module is switched off so that said linear laser beam is simultaneously disappeared;
   a reflected light generation step: said barcode generates a second reflected light from environment light source;
   a reflected light source receiving step: said second reflected light is received by said image pickup module;
   a decoding step: said image pickup module transform said second reflected light into electronic signal and conduct to a central control module so as to conduct decoding;
   a reading confirmation step: when said decoding step is finished, a reading confirmation light source module is actuated to generate a colored light by which operators can confirm the accomplishment of barcode reading;
   said indicating light source starting step is repeated; and
   the time period from the switch-off of the indicating light source to the switch-on of the same is controlled to be less than $1/16$ second.

2. The actuation method of virtual laser barcode scanner as claimed in claim 1, wherein said image pickup module is a linear CCD image sensing module which can receive synchronously reflected light spots of 500 to 2000 pixels and transform each of the reflected light spots thus received to electronic signal.

3. The actuation method of virtual laser barcode scanner as claimed in claim 1, wherein said image pickup module is a linear CMOS image sensing module which can receive synchronously reflected light spots of 500 to 2000 pixels and transform each of the reflected light spots thus received to electronic signal.

4. The actuation method of virtual laser barcode scanner as claimed in claim 1, wherein said environment light source mentioned in said reflected light source generation step is either an indoor illumination light or an outdoor sunlight.

* * * * *